2. Vol

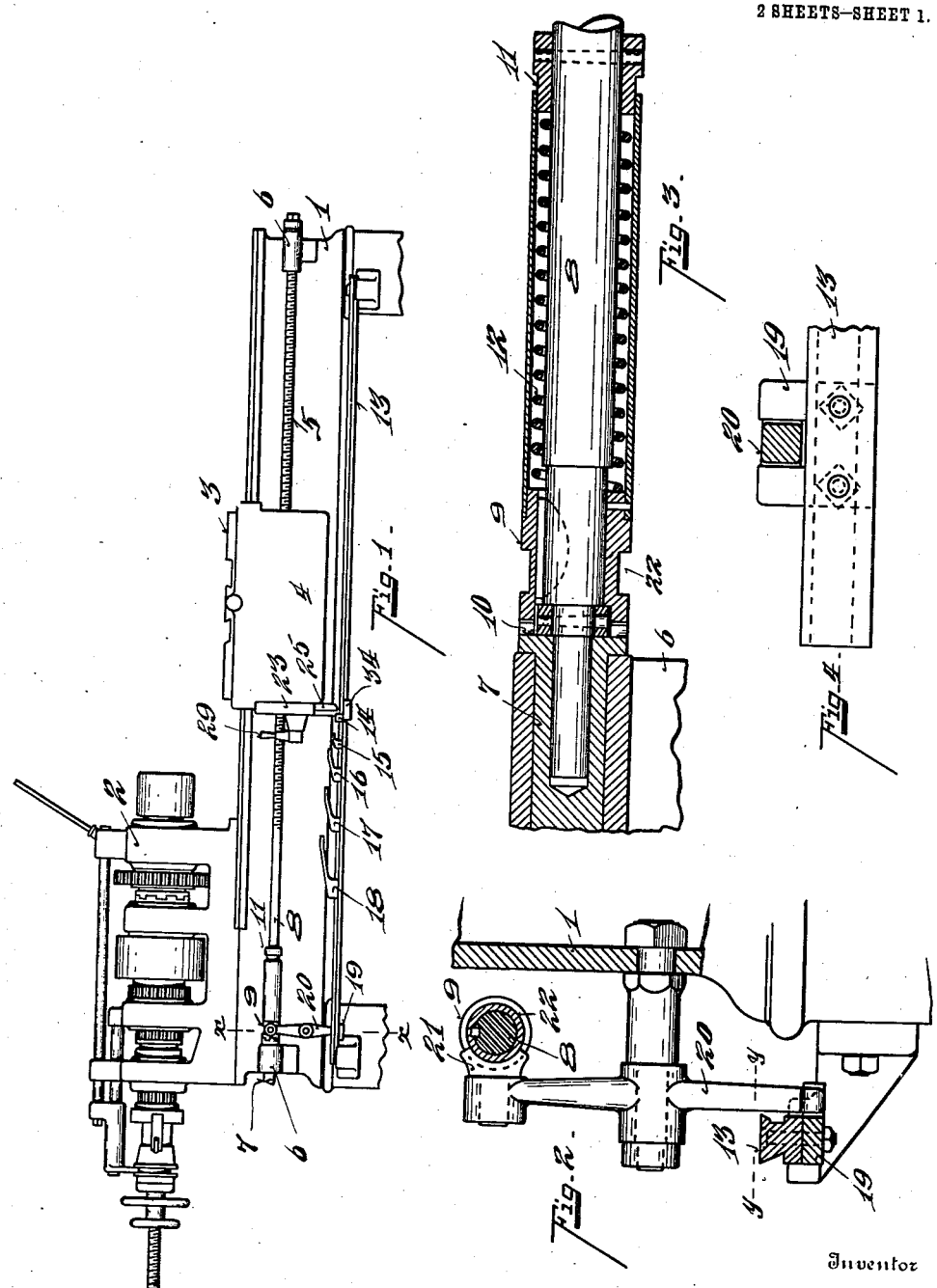

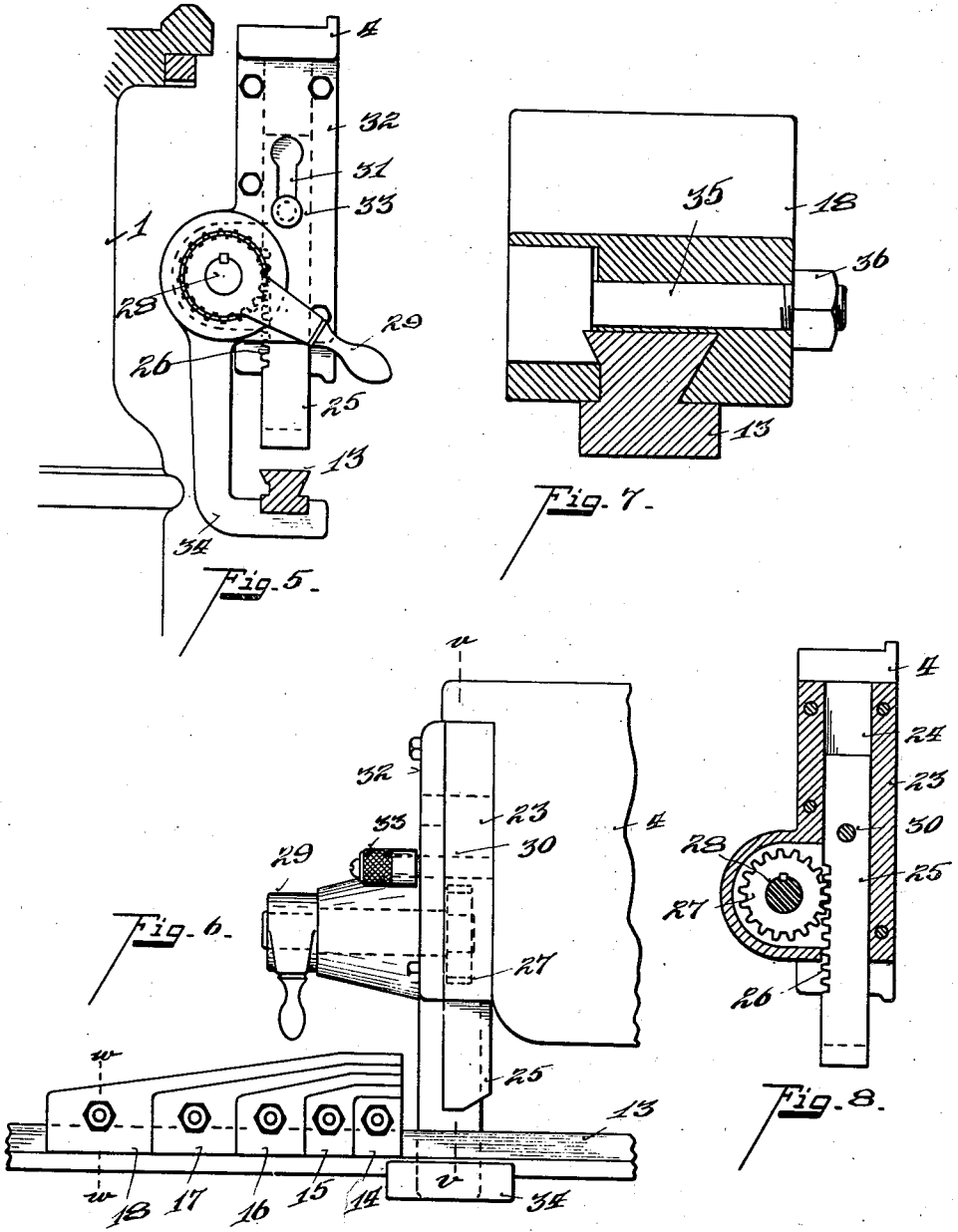

UNITED STATES PATENT OFFICE.

NICHOLAS D. CHARD, OF CINCINNATI, OHIO, ASSIGNOR TO THE LODGE & SHIPLEY MACHINE TOOL CO., OF CINCINNATI, OHIO, A CORPORATION.

LATHE.

1,007,181.   Specification of Letters Patent.   Patented Oct. 31, 1911.

Application filed September 22, 1909. Serial No. 519,025.

*To all whom it may concern:*

Be it known that I, NICHOLAS D. CHARD, a citizen of the United States, residing at Cincinnati, in the county of Hamilton and State of Ohio, have invented certain new and useful Improvements in Lathes, of which the following is a specification.

My invention relates to an improvement in lathes.

One of the objects of my invention is to provide means for automatically stopping the feed of the carriage at predetermined points.

Another object of my invention is to provide a lathe with a series of adjustable stops in the path of carriage movement adapted to be engaged by means carried by the carriage for automatically stopping its feed thereof with the carriage provided with means for releasing its stop and automatically throwing in the feed and positioning the parts for a second stop.

Another object of my invention is to provide a lathe with a series of stops in the path of the carriage movement adjustably mounted and arranged to permit periodical interference and engagement of carriage feed without change of position of cutting tool relative to the work.

The various features of my invention are more fully set forth in the description of the accompanying drawings, forming a part of this specification, in which:—

Figure 1 is a side elevation of a lathe with my improvements relative to controlling the feed of the carriage applied. Fig. 2 is an enlarged section on line $x$, $x$, Fig. 1. Fig. 3 is an enlarged section through one end of the carriage feed shaft, illustrating its means for engaging and disengaging the same from the main drive. Fig. 4 is a section on line $y$, $y$, Fig. 2. Fig. 5 is an end elevation of the lathe apron, illustrating the means thereon to engage stops for controlling the carriage feed. Fig. 6 is a front elevation thereof. Fig. 7 is an enlarged section on line $w$, $w$, Fig. 6, illustrating the means for clamping the stops. Fig. 8 is the section on line $v$, $v$, Fig. 6.

It has long been desirable to provide an engine screw cutting lathe with means whereby the same can perform the functions and turn out the work now accomplished upon a special machine known to the trade as a turret lathe, in which a piece of work is required to be brought against the action of a series of tools to complete the same without rechucking the work upon the headstock, or removing the same from the machine until completed.

With my improved lathe it is possible to turn out duplicate pieces of work with various diameters with predetermined widths to each diameter, without stopping the machine to gage the work, the same being taken care of by the means for stopping the feed of the carriage when the same has traveled a predetermined length for a desired width of cut, and second, limiting the movement of the slide plate carrying the tools, for cutting a predetermined diameter by movement of the slide in one direction with the reverse movement thereof, bringing a second stop into position for turning a second diameter, the latter feature is made the subject of a separate application, to-wit, September 22, 1909, Serial No. 519,026. This renders the turning of duplicate pieces to accurate precision, without gaging and without liability of mistake, rendering a saving of time and accuracy with the machine in the hands of an unskilled operator, it being known that a great deal of lost time is had by stopping the machine to gage up the work in the ordinary methods of metal turning, and with my improved lathe duplicate parts can be formed of certain classes of work, without the use of gigs or special work-holding means and guides.

The various parts for controlling the various speeds are easily and quickly thrown out of position, putting the lathe in commission for ordinary use.

1 represents the bed of the lathe, 2 the head-stock, which, as illustrated, is of a type to clamp the work within the spindle and the details of which are shown and described, and form a part of a separate application filed on even date herewith.

3 represents the lathe carriage, 3ª, 4 the apron therefor, provided with the usual gearing and appliances for feeding the carriage longitudinally upon the bed or base 1. The gearing, being of well-known construction, is not shown, is in driving connection with the feed-screw shaft 5, said shaft being journaled in the bearings 6, at each end of the lathe bed. The screw feed shaft is of two part form, in which the two sections are adapted to be clutched together to transmit motion from one to the other, and further, to enable the control of the feed automatically.

7 represents the section of the feed-screw shaft receiving motion through a train of gears or equivalent leading from the lathe spindle, which may be of construction and of a method desired and common with machine tools of this class, for transmitting motion from the main drive to the carriage feed shaft.

8 represents a screw section of the feed-shaft 5, fitting at one end into the section 7, serving as a bearing therefor, when the driving connection between the two sections is released.

9 represents a clutch sleeve provided with clutch teeth, adapted to engage with the clutch teeth 10, formed upon a flange of the section 7 of the feed-screw shaft, said sleeve 9 being supplied with teeth to the screw shaft section 8. 11 represents a collar fixed to the screw shaft section 8, and 12 represents a spring bearing against the collar 11, at one end, and against the clutch sleeve 9 for normally engaging the clutch sleeve 9 with the clutch portion of screw shaft section 7, for transmitting motion to the screw section 8. Thus, under normal conditions and uses of the lathe, the feed screw shaft is in driving relation with its driving elements for feeding the carriage.

In order to automatically control the feed of the carriage to stop the same at a predetermined distance of its travel and produce a series of such stops, I have provided the following instrumentalities:—13 represents a stop-supporting rail preferably slidable in brackets projecting from the lathe bed, upon which rail are adjustably mounted a series of stops 14, 15, 16, 17 and 18, arranged and constructed so as to permit individual adjustment relative to each other and collectively to a unit to aline them all to one fixed degree or point, as is illustrated in Fig. 6. This enables the adjusting of several stops to any fraction of an inch relatively to each other. Five stops are shown, but more or less may be provided, as desired. The stop rail 13 may be provided with graduation not shown, for conveniently adjusting the stops thereon.

The stop rail 13 is provided with the yoke-plate 19 fixed thereto, and straddling one arm of the clutch-actuating lever 20, pivotally mounted to the bed of the lathe, with its opposite arm provided with a yoke 21, engaged into the groove 22 of the clutch sleeve 9. Thus, when action through the travel of the carriage is brought against one of the stops fixed to the stop-rail, the stop-rail will move with the carriage until the clutch-sleeve 9 is thrown out of engagement with the clutch-sleeve 10, of the screw shaft section 7. To accomplish this by the travel of the carriage, the following mechanism is provided:—23 represents a plate fixed to one end of the carriage-apron 4, provided with a slide-way 24, within which the stop-bar 25 slides, said stop-bar is preferably provided with rack teeth 26, intermeshed with a rack-pinion 27, fixed to a stud-shaft 28, journaled in the plate 23. 29 represents a hand-lever fixed to the stud-shaft 28, for rotating the pinion 27, to raise or lower the stop-bar 25. 30 represents a pin fixed to the stop-bar 25, and projected through a slot 31, formed in the housing plate 32. 33 represents a knurl loosely mounted on the pin 30, adapted to be slid into the orifice formed at one terminal of the slot 31, forming means for locking the stop-bar 25 in its upper position, to free the same against contact with any one of the stops upon the stop-rail 13. 34 represents an L-shaped bracket formed integral with the plate 23, and extended beneath the stop-rail 13, forming a brace therefor, to prevent flexing or quivering of the stop-rail, when the stop-bar 25 engages one of the stops in the feed releasing action.

When the stops 14, 15, 16, etc., are set relatively to each other, say as illustrated in Fig. 1, the carriage feeding toward the headstock with the stop-bar 25 in its lowest position it will first strike against stop 14, disengaging the feed, and bringing the carriage to rest. Raising the stop-bar 25 through the hand-lever 29 above the stop 14, releases the engagement therewith, causing the stop-rail 13 to instantly move to normal position automatically by the pressure of spring 12 against the clutch-sleeve 9, and connections with stop-rail, permitting the engagement of the clutch-members heretofore described, with the feed shaft, feeding the carriage forward a second time, and continuing in its travel until the stop-bar 25 engages the second stop 15, and so on. The stops 14, 15, etc., may be adjustably secured upon the rail 13 in any well-known manner, one form being as illustrated in Fig. 7, in which the stops are dove-tailed upon the rail and provided with a bolt 35, the head of which engages the rail as the nut 36 is turned up, locking the stops rigidly in position upon the rail.

While I have shown stops as directly mounted on the rod longitudinally movable to control the clutch on the feed shaft, and the trip or stop-engaging device on the carriage, it is obvious that these elements could be transposed without any change of function, that is, the stops mounted on a rigid bar, and the stop-engaging device on the carriage to be provided with connections to the clutch, for operating the latter.

The stops can be compiled upon one another in overlapping relationship so as to bring their respective trip-engaging faces into vertical alinement; second, they can be adjusted while in telescopic relation into a step-like formation, one over-lying the other, and third, they can be thrown out of telescopic relation and independently adjusted to occupy positions at any desired intervals on their supporting rod.

Certain conditions of work require the second arrangement, named above, which condition could only be fulfilled by stops having this telescoping or over-lapping organization.

Having described my invention, I claim:—

1. In a machine tool of the class described, having a traveling carriage, means for feeding the same, in combination with a series of stops adjustable in the path of the carriage movement, said stops having their bases in the same horizontal plane and their carriage arresting surfaces in different horizontal planes and projecting in position for engaging with said carriage to discontinue its feed at periods of its travel, said carriage arresting surfaces having an overlapping arrangement relative to each other, whereby they may be assembled to bring their points of carriage engagement into alinement.

2. In a machine of the class described, a carriage formed with an apron, a feed mechanism therefor, a feed controlling clutch, a rod supported on the bed in a horizontal plane parallel with the plane of the carriage travel and located below the apron, a series of step-like stops adjustably supported on said rod in the path of carriage movement and adapted to have their carriage arresting surfaces brought into overlapping relation, a stop-engaging device on the carriage apron adapted to be set to engage a selected stop, and means whereby the coaction of the stop engaging member with a stop is caused to actuate said clutch.

3. In a machine of the class described, a bed, a carriage, feed mechanism, and feed control, a series of stops supported in the path of carriage travel with their trip engaging surfaces disposed in different horizontal planes, an adjustable trip on the carriage operatively connected with the feed control, and means whereby the act of releasing the trip from contact with a given stop in adjusting it to engage the next stop of the series, coincidentally throws in the feed.

4. In a machine of the class described, a bed, a carriage, feed mechanism for traversing the carriage on the bed, a clutch, clutch controlling and stop supporting mechanism, stops thereon adjustable from a coincident position to positions of any desired relative intervals, said stops having their bases adjustably clamped in the same horizontal plane, the trip engaging surfaces of the stops lying in different horizontal planes, and means adapted to engage said stops to actuate the clutch controlling mechanism and clutch and throw out the main carriage feed.

5. In a machine of the class described, a bed, a carriage feed mechanism for traversing the carriage on the bed, a clutch normally held in driving engagement, an automatic trip and stop mechanism, the stops being adjustable from a coincident position to positions of any desired relative intervals, means whereby the trip throws out the clutch, whereby the release of the stop engaging member automatically throws in the clutch for the next cut.

6. In a device of the class described, a bed, a carriage formed with an apron, feed mechanism for traversing the carriage on the bed, a rod horizontally extended and supported in the path of carriage travel at a point below the apron and adapted for controlling said feeding mechanism, a series of step-like stops adjustably secured on the rod with their trip engaging surfaces lying in different horizontal planes, and an adjustable stop engaging member projected below the apron and adapted to engage said stops to actuate said feed controlling mechanism and to discontinue the carriage feed.

7. In a lathe, a bed, a carriage formed with an apron, feed, and feed control, a series of step-like stops arranged in the path of carriage travel with their trip engaging surfaces lying in different horizontal planes, the bases of said stops being adjustably secured in the same horizontal plane, a stop-engaging member on the carriage apron, having a handle adapted to be independently manipulated to set the stop engaging member in different horizontal positions corresponding to the planes of the various stops, all of said stops being located below the apron, and connections between said trip mechanism and the main feed control.

8. In a machine of the class described, a bed, a carriage, and clutch controlled feed mechanism therefor, a rod extended in the line of carriage travel, a series of bracket stops alined at intervals on said rod, the tripping surfaces being exposed in different horizontal planes, a stop engaging member on the carriage, having a handle thereon adapting it to be manually and independently set in different horizontal positions to engage a selected stop, and means whereby said engagement actuates the clutch.

9. In a device of the class described, a bed, a carriage and its apron slidably mounted thereon, means for feeding the carriage, a series of stops arranged with their bases in the same horizontal plane and their carriage arresting surfaces arranged step-like in different horizontal planes, said stops being positioned in the path of carriage travel below the apron, and a vertically adjustable member on the carriage apron adapted to be set to selectively engage each of said stops, whereby the movement of the carriage is arrested.

10. In a device of the class described, a bed, a carriage with its apron slidably mounted thereon, means for feeding the carriage, a series of stops arranged with their bases adjustably secured in a single horizontal plane below the apron, their carriage arresting surfaces being arranged step-like in different horizontal planes, said carriage arresting surfaces being positioned in the path of carriage travel, and adapted to be adjusted longitudinally, the bases moving in the same and the engaging surfaces in different horizontal planes, said carriage arresting surfaces being adapted to be assembled into overlapping relationship, and a vertically adjustable member on the carriage, adapted to be set to selectively engage each of said carriage arresting surfaces, whereby the carriage movement is arrested.

In testimony whereof, I have hereunto set my hand.

NICHOLAS D. CHARD.

Witnesses:
 OLIVER B. KAISER,
 EMMA SPENER.